Patented Apr. 27, 1954

2,676,991

UNITED STATES PATENT OFFICE 2,676,991

METHOD OF MAKING VITAMIN A ALDEHYDE

Marshall Guntrum and Charles D. Robeson, Rochester, N. Y., assignors to Eastman Kodak Company, Rochester, N. Y., a corporation of New Jersey No Drawing. Application September 11, 1951, Serial No. 246,166

12 Claims. (Cl. 260—598)

This invention relates to methods of making vitamin A aldehyde and is particularly concerned with the conversion of a hydroxy vitamin A acetal to vitamin A aldehyde.

Vitamin A aldehyde is a valuable compound in the manufacture of synthetic vitamin A, since it is readily reduced to vitamin A alcohol by well-known reduction methods such as the Meerwein-Ponndorf reduction with aluminum alkoxide and alcohol or the reduction with an ether-soluble metal hydride or similar method of reducing olefinic aldehydes to the corresponding alcohol. Vitamin A alcohol is, of course, readily esterified by known methods to form the acetate, palmitate or similar well-known ester, vitamin A usually being sold commercially in the ester form.

In the synthesis of vitamin A, either or both of the Reformatsky and Grignard type reactions are useful in building up the requisite skeletal molecular structure of vitamin A. Both reactions yield a hydroxy compound, however, and dehydration is necessary to attain vitamin A-active material. In the case of the polyenes of the vitamin A series, dehydration usually results in a substantial amount of concomitant isomerization whereby a large proportion of product is an isomeric compound rather than the desired vitamin A.

Among the potential vitamin A intermediates, the hydroxy polyene acetals possessing the carbon skeleton of vitamin A and hereinafter referred to for brevity as hydroxy vitamin A acetals, are very valuable intermediates since they can be prepared in good yield by a variety of methods. Such hydroxy vitamin A acetals include both the monohydroxy vitamin A acetals and the dihydroxy vitamin A acetals (refered to for convenience as vitamin A diol acetals), both cyclic and open acetals, and compounds having an unsaturated structure isomeric to the α,β-unsaturated completely conjugated vitamin A structure.

It is accordingly an object of this invention to provide a new method of making vitamin A aldehyde.

It is a further object of this invention to provide an effective method of converting hydroxy polyene acetals having the carbon skeleton of the vitamin A molecule to vitamin A aldehyde in high yield.

Another object of the invention is to convert hydroxy vitamin A acetals to vitamin A aldehyde without objectionable yield losses due to isomerization.

Another object of the invention is to provide a method of converting hydroxy vitamin A acetals to vitamin A aldehyde in a single reaction mixture.

Another object of the invention is to dehydrate, hydrolyze and rearrange hydroxy vitamin A acetals to vitamin A aldehyde in a single reaction step.

Another object of the invention is to facilitate vitamin A syntheses involving a Reformatsky or Grignard reaction which produces a hydroxy vitamin A acetal.

Another object of the invention is to dehydrate, hydrolyze and rearrange vitamin A diol acetal to vitamin A aldehyde in good yield.

Another object of the invention is to provide a method which minimizes the yield losses normally attendant to converting a hydroxy vitamin A compound to vitamin A-active material.

Another object of the invention is to convert vitamin A 3,7-diol acetal to vitamin A aldehyde in a single reaction step.

Another object of the invention is to provide a method which accomplishes in a single step a conversion which normally would involve a plurality of steps with an attendant lowered yield due to multiple reactions, isolations and handlings.

Other objects will be apparent from the description and claims which follow.

These and other objects are attained by means of this invention as described more fully hereinafter with reference to certain preferred embodiments, the method embodying the invention comprising heating a mixture of a hydroxy polyene acetal having the carbon skeleton of vitamin A, an ionizable acid and an organic base and thereby, in a single reaction mixture, dehydrating, hydrolyzing and rearranging such hydroxy vitamin A acetal to vitamin A aldehyde in a single step.

The hydroxy polyene acetals having the carbon skeleton of vitamin A, and herein called hydroxy vitamin A acetals, include both monohydroxy and dehydroxy acetals and both cyclic and open acetals, the dialkyl acetals being conveniently employed. Desmotropic isomers having an unsaturated system isomeric with the vitamin A unsaturated linkage system and having the vitamin A skeleton are also included. Typical vitamin A diol acetals include the 3,7-diol of the formula

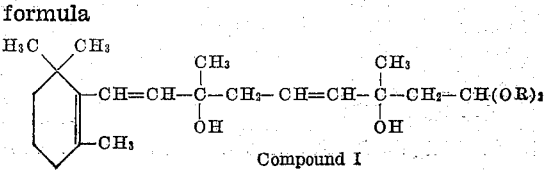

Compound I wherein R is an alkyl group in an open acetal for purposes of illustration; the 3,6-diol of the formula

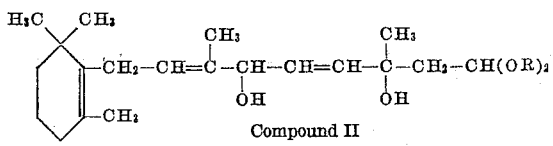
Compound II and the 3,5-diol of the formula

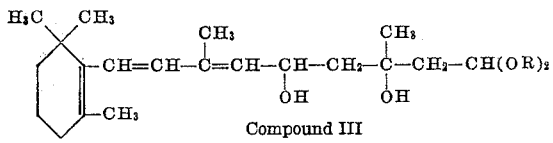
Compound III

Typical monohydroxy vitamin A acetals include the 3-hydroxy compound of the formula

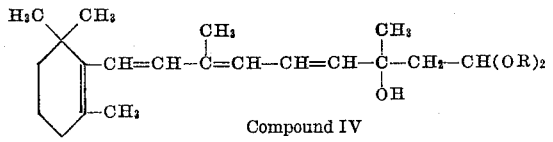
Compound IV or its 3-hydroxy desmotropic isomer of the formula

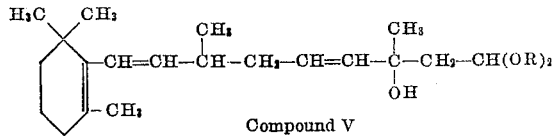
Compound V as well as the 7-hydroxy compound of the formula

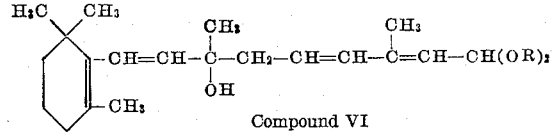
Compound VI and similar hydroxy vitamin A acetals.

The hydroxy vitamin A acetals can be prepared in a number of ways. Thus, for example, Compound I can be prepared by condensing β-ionone with propargyl bromide in the presence of zinc to form a propinyl carbinol, condensing the propinyl carbinol with a dialkyl acetal of β-ketobutyraldehyde by means of a Grignard reaction and subjecting the resulting condensation product to partial hydrogenation with a molecular equivalent of hydrogen in the presence of a palladium catalyst to reduce the acetylenic linkage to an olefinic linkage and thereby obtain Compound I.

Compound II is readily prepared by reacting a dialkyl acetal of β-ketobutyraldehyde with sodium acetylide in liquid ammonia, subjecting the resulting product to a Grignard reaction with the C14-aldehyde, 4-(2,6,6-trimethyl cyclohexen-1-yl)-2-methyl-but-2-ene-1-al, and partially hydrogenating the condensation product thereby obtained to form the 3,6-diol, Compound II.

Compound III can be prepared by reacting β-ionylidene acetaldehyde with methyl magnesium bromide, oxidizing the resulting carbinol to a carbonyl compound and condensing the carbonyl compound with 4,4 - dialkoxy - 2 - butanone by means of sodium methylate, and reducing the hydroxy keto vitamin A acetal thus obtained to Compound III. This method is cumbersome, however, and β-ionylidene acetaldehyde is preferably employed for making Compound IV. Compound IV is prepared by reacting β-ionylidene acetaldehyde with a dialkyl acetal of β-ketobutyraldehyde in the presence of sodium methylate and reacting the resulting product with methyl magnesium bromide.

Compound V can be prepared by a process similar to that employed for preparing Compound I. β-ionone is condensed with propargyl bromide in the presence of zinc to form an ethinyl carbinol which is then dehydrated with hydrochloric acid in methyl alcohol. A substantial proportion of the dehydration occurs by splitting out of a ring hydrogen to give cyclohex-2-ene-1-ylidenic compound which is thereafter carried through the process employed with Compound I, thus giving Compound V as a product. That portion of the propinyl carbinol which dehydrates in the side chain can be carried through the same process to give Compound IV. A mixture of Compound IV and Compound V can also be prepared by treating Compound I with thionyl chloride and pyridine whereby the 7-hydroxy group splits off leaving the 3-hydroxy group largely intact.

Compound VI can be prepared by condensing propargyl bromide with a dialkyl acetal of β-ketobutyraldehyde in the presence of zinc, dehydrating the resulting condensation product, subjecting the dehydrated product to a Grignard reaction with β-ionone, and partially hydrogenating the acetylenic linkage to give Compound VI.

The hydroxy vitamin A acetals are largely devoid of vitamin A biological activity but possess the requisite skeletal carbon structure. In order to obtain vitamin A-active material, it is necessary to dehydrate hydroxy vitamin A compounds which usually causes concomitant formation of a major proportion of a cyclohex-2-ene-1-ylidenic isomer of vitamin A. In the process embodying this invention, however, dehydration of the hydroxy compounds, hydrolysis of the acetal group, and rearrangement of isomers formed by the dehydration is effected in a single reaction step to give vitamin A aldehyde. The exact mechanism by which the conversion occurs is not known since the conversion takes place without isolation of any intermediate products.

Employing Compound I for purposes of illustration, the process embodying the present invention can be illustrated graphically as follows:

Compound I $\xrightarrow[\text{Organic base}]{\text{Ionizable acid}}$

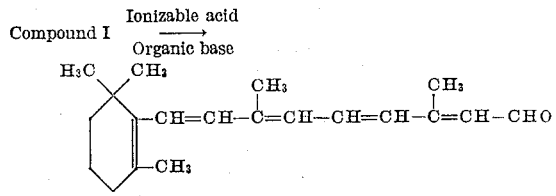

The conversion of other hydroxy vitamin A acetals to vitamin A aldehyde proceeds in similar fashion in a single reaction mixture employing the process embodying the present invention.

In practising this invention, a mixture of the hydroxy vitamin A acetal to be converted, an ionizable acid and an organic base is heated whereby the conversion is effected in a single reaction step. The conversion is effected in solution in a ketonic solvent; the dialkyl ketones such as acetone, methyl ethyl ketone, dimethyl ketone, methyl isopropyl ketone, diethyl ketone or the like being preferred.

Any of the well-known ionizable acids can be employed, although the mineral acids are preferred and particularly efficacious results are obtained with the hydrohalic acids such as hydrochloric acid, hydrobromic acid and the like. Other well-known ionizable acids which are suitable are typified by sulfuric acid, phosphoric acid, acetic acid, oxalic acid, hydroiodic acid and the like.

In like manner, any of the well-known organic bases can be employed, the amines being desirably employed. Typical organic bases which are suitably employed in practising the invention include the members of the pyridine series such as pyridine, α-picoline, β-picoline, γ-picoline, 1,2-lutidine, 1,3-lutidine, 2,4-lutidine, 2,6-lutidine, 3,6-lutidine, and similar well-known pyridine bases; aniline, quinoline, piperidine, aminopyridine, morpholine, dimethyl amine and similar well-known organic bases.

For convenience, the acid-organic base can be added as a single compound such as an amine hydrohalide, the reaction mixture in such case including the ionizable acid and the organic base under reaction conditions. Typical compounds of this type include pyridine hydrochloride, quinoline hydrobromide, pyridine hydrobromide, quinoline hydrochloride, lutidine hydrochloride and similar amine hydrohalides.

The reaction proceeds slowly at room temperature or slightly elevated temperatures. The conversion is desirably effected, however, at elevated temperatures for best results, the reflux temperature of the reaction mixture ordinarily being employed. The reaction is normally complete in 1–3 hours at reflux although longer or shorter periods can be employed depending upon the temperature at which the conversion is effected and the particular reactants employed.

The invention is illustrated by the following examples of certain preferred embodiments of the invention, it being understood that any of the hydroxy polyene acetals having the vitamin A carbon skeleton can be converted to vitamin A aldehyde using other well-known ionizable acids and organic bases in various combinations in accordance with the invention.

Example 1

To 11 g. of the dimethoxy acetal corresponding to Compound I dissolved in 80 cc. of methyl ethyl ketone was added 40 cc. of methyl ethyl ketone containing 1.45 g. of quinoline and 20 cc. of methyl ethyl ketone containing 1.17 g. of concentrated hydrochloric acid. The resulting mixture was refluxed for 1.5 hours, cooled, poured into 500 cc. of water and extracted with ether. The ether extract was washed three times with 5% hydrochloric acid, twice with 0.5 N. potassium hydroxide and then washed to neutrality with water. The washed extract was dried over anhydrous sodium sulfate and the ether removed by evaporation to give 8.7 g. of a deep red concentrate of vitamin A aldehyde having $$E^{1\%}_{1\,cm.}\,(372\ m\mu) = 870$$

Example 2

A 1.0 g. sample of Compound I was dissolved in 8 cc. of methyl ethyl ketone and to the resulting solution was added 4 cc. of methyl ethyl ketone containing 0.092 g. of pyridine and 2 cc. of methyl ethyl ketone containing 0.117 g. of concentrated hydrochloric acid. The reaction mixture was refluxed for 2 hours, and the product worked up in the usual manner to give a crude vitamin A aldehyde product having $$E^{1\%}_{1\,cm.}\,(369\ m\mu) = 716$$

Example 3

A 1.0 g. portion of Compound IV was dissolved in 8 cc. of methyl ethyl ketone and to this was added 4 cc. of methyl ethyl ketone containing 0.11 g. quinoline and 2 cc. of methyl ethyl ketone containing 0.12 g. of concentrated hydrochloric acid. After refluxing for 2 hours, the product exhibited $E_{max}=372\ m\mu$ characteristic of vitamin A aldehyde.

Example 4

A 0.5 g. portion of Compound I was dissolved in 5 cc. of acetone containing 0.063 g. of pyridine hydrochloride. The reaction mixture was refluxed for 4 hours to give a crude vitamin A aldehyde concentrate having $$E^{1\%}_{1\,cm.}\,(368\ m\mu) = 287$$

Example 5

To 0.141 g. of quinoline dissolved in 5 cc. of methyl ethyl ketone was added 0.112 g. of sulfuric acid in 5 cc. of methyl ethyl ketone and 1 g. of vitamin A 3,7-diol dimethoxy acetal. The resulting mixture was refluxed for 3 hours and the conversion to vitamin A aldehyde was confirmed by the product having $$E^{1\%}_{1\,cm.}\,(369\ m\mu) = 206$$

Example 6

A solution of 0.4 equivalent of quinoline hydrobromide and 1.0 equivalent of Compound I in 50 cc. of methyl ethyl ketone was refluxed for 2 hours. The product was extracted with ether, washed, dried and evaporated to give a vitamin A aldehyde concentrate having $$E^{1\%}_{1\,cm.}\,(372\ m\mu) = 540$$

Example 7

A solution of 1.0 g. of Compound I in 8 cc. of methyl ethyl ketone was mixed with 4 cc. of methyl ethyl ketone containing 0.099 g. of piperidine and 2 cc. of methyl ethyl ketone containing 0.00122 mole of concentrated hydrochloric acid. The mixture was refluxed for 2 hours to give a vitamin A aldehyde product having $$E^{1\%}_{1\,cm.}\,(368\ m\mu) = 610$$

Example 8

A reaction mixture consisting of 1.0 g. of vitamin A 3,7-diol dimethoxy acetal and 0.15 g. of quinoline hydrochloride dissolved in 14 cc. of acetone was refluxed for 2 hours. The product has $$E^{1\%}_{1\,cm.}\,(368\ m\mu) = 357$$

showing conversion to vitamin A aldehyde. The E values in all of the examples were determined in ethanol solution.

Thus, by means of this invention, hydroxy polyene acetals having the vitamin A carbon skeleton and prepared by a variety of processes are converted to vitamin A aldehyde in a single reaction step whereby the disadvantages attendant to dehydration, hydrolysis and rearrangement in separate steps are largely obviated, and a product readily convertible to vitamin A alcohol and vitamin A esters is obtained.

While the invention has been described in considerable detail with reference to certain preferred embodiments thereof, it will be understood that variations and modifications can be effected within the spirit and scope of the invention as described hereinabove and as defined in the appended claims.

We claim:

1. The method of converting a hydroxy polyene actal to vitamin A aldehyde in a singe reaction mixture which comprises heating a solution in a ketonic solvent of a hydroxy polyene acetal having the vitamin A carbon skeleton, an ionizable acid and an organic base and thereby, in a single step, dehydrating, hydrolyzing and rearranging said hydroxy vitamin A acetal to vitamin A aldehyde.

2. The method of converting a vitamin A diol acetal to vitamin A aldehyde which comprises heating a solution, in a ketonic solvent, of a vitamin A diol acetal, a mineral acid and an organic base and thereby, in a single step, dehydrating, hydrolizing and rearranging said vitamin A diol acetal to vitamin A aldehyde.

3. The method of converting a hydroxy vitamin A dialkyl acetal to vitamin A aldehyde which comprises heating a solution, in a ketone, of a hydroxy vitamin A dialkyl acetal, a hydrohalic acid and an organic base and thereby, in a single reaction mixture, dehydrating, hydrolyzing and rearranging said hydroxy vitamin A dialkyl acetal to vitamin A aldehyde.

4. The method of converting a hydroxy vitamin A dialkyl acetal to vitamin A aldehyde which comprises heating a solution, in a ketone, of a hydroxy vitamin A dialkyl acetal, hydrochloric acid and an organic base and thereby, in a single reaction mixture, dehydrating, hydrolyzing and rearranging said hydroxy vitamin A dialkyl acetal to vitamin A aldehyde.

5. The method of converting a hydroxy vitamin A dialkyl acetal to vitamin A aldehyde in a single reaction step which comprises heating a solution, in a ketone, of a hydroxy vitamin A dialkyl acetal, an ionizable acid and quinoline.

6. The method of converting a hydroxy vitamin A acetal to vitamin A aldehyde which comprises heating a solution, in a ketone, of a hydroxy vitamin A acetal, an ionizable acid and a member of the pyridine series.

7. The method which comprises heating a mixture of a hydroxy vitamin A acetal of the formula

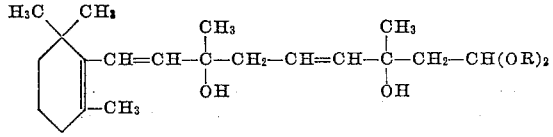

wherein R is an alkyl group; an ionizable acid, and an organic base in a ketonic solvent, and thereby forming vitamin A aldehyde.

8. The method which comprises heating a solution, in a ketone, of a hydroxy vitamin A acetal of the formula

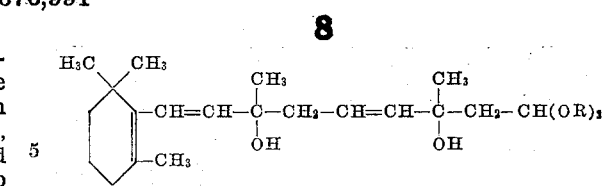

wherein R is an alkyl group; a hydrohalic acid, and an organic base, and thereby forming vitamin A aldehyde.

9. The method which comprises heating a solution, in a ketone, of a hydroxy vitamin A acetal of the formula

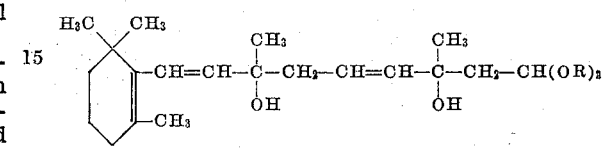

wherein R is an alkyl group; hydrochloric acid, and an organic base, and thereby forming vitamin A aldehyde.

10. The method of making vitamin A aldehyde which comprises heating a mixture of a hydroxy polyene acetal having the vitamin A carbon skeleton, a hydrohalic acid and an amine in a ketone solution.

11. The method of making vitamin A aldehyde which comprises heating a solution, in a ketone, of a hydroxy vitamin A acetal and an amine hydrohalide.

12. The method of making vitamin A aldehyde which comprises heating a solution, in a dialkyl ketone, of a hydrohalic acid, an amine, and a compound of the formula

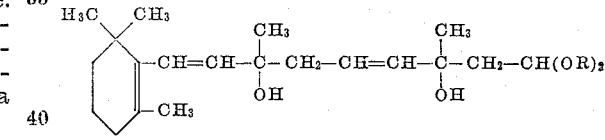

wherein R is an alkyl radical.

References Cited in the file of this patent

UNITED STATES PATENTS

| Number | Name | Date |
| --- | --- | --- |
| 2,577,538 | Milas | Dec. 4, 1951 |
| 2,586,305 | Copenhaver | Feb. 19, 1952 |
| 2,586,306 | Copenhaver | Feb. 19, 1952 |
| 2,615,922 | Starke | Oct. 28, 1952 |

OTHER REFERENCES

Heilbron, J. Chem. Soc., (England), March 1948, pages 386–393.